April 30, 1957
E. V. BUNTING
2,790,365
CONTROLS FOR TRACTORS
Filed June 29, 1954
3 Sheets-Sheet 1
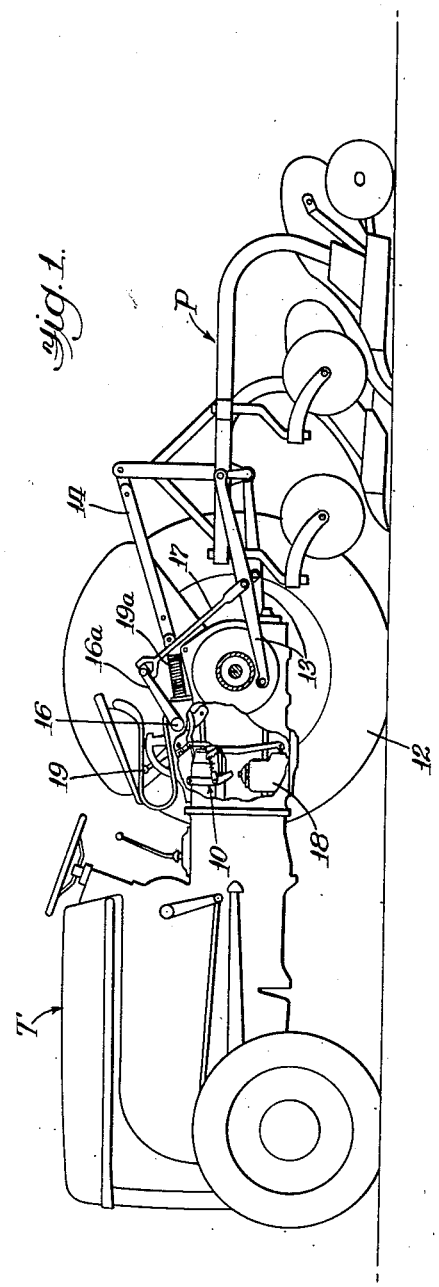
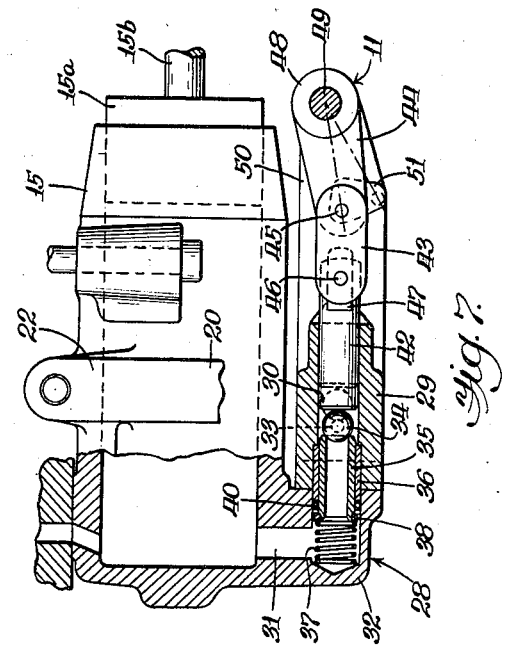
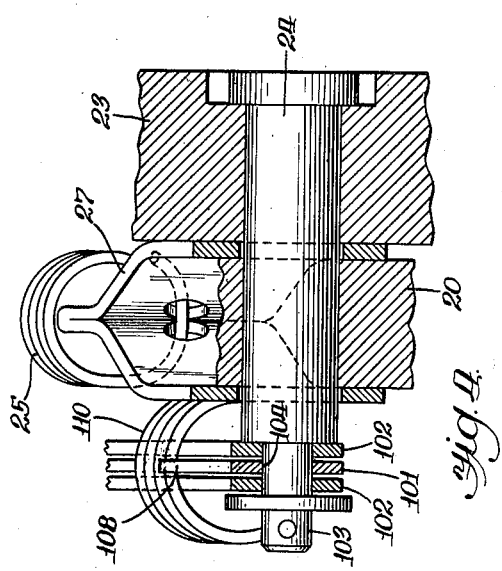
INVENTOR.
Ernest V. Bunting
BY
Carlson, Pitzner, Hubbard & Wolfe
Attys.

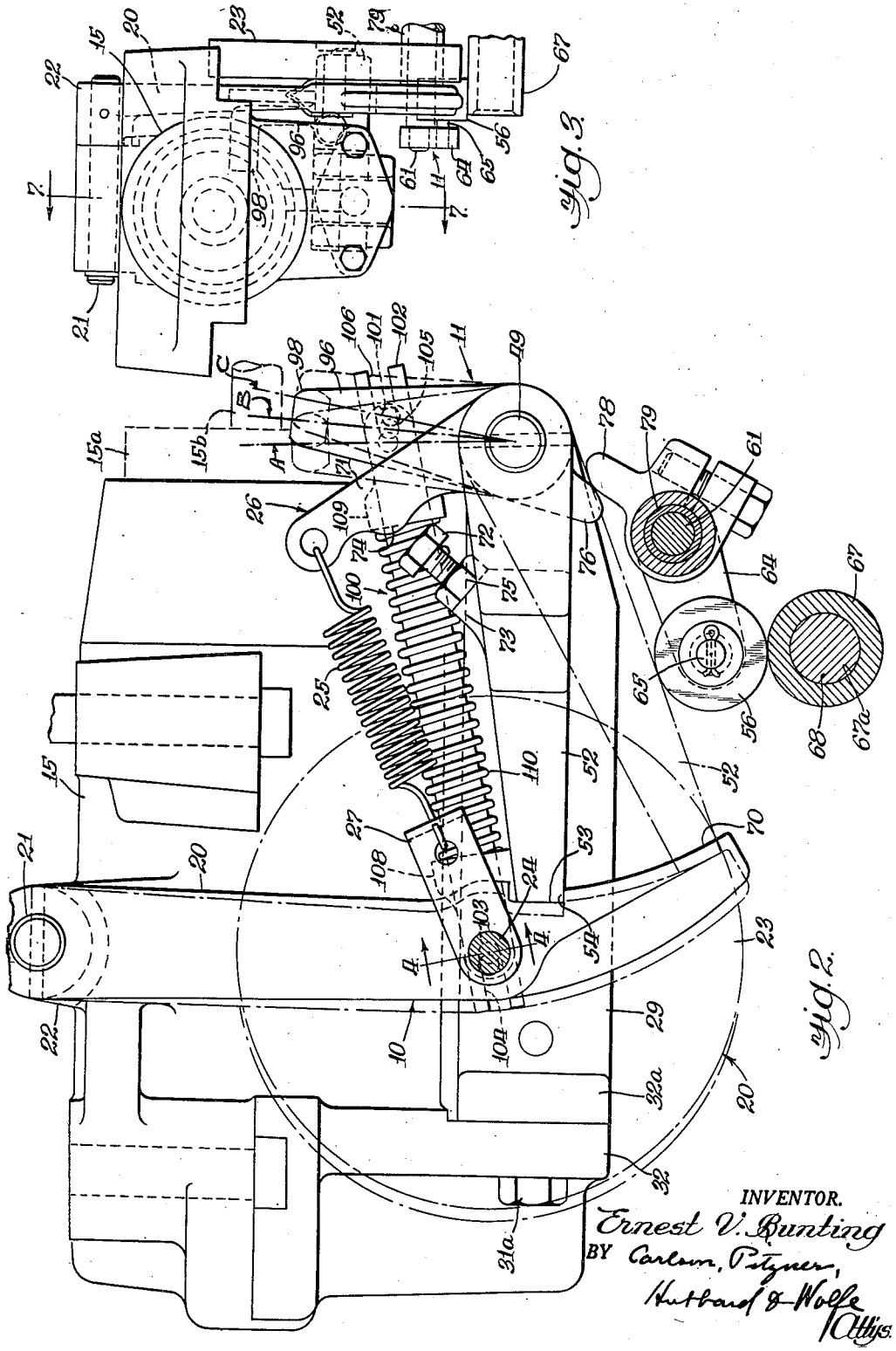

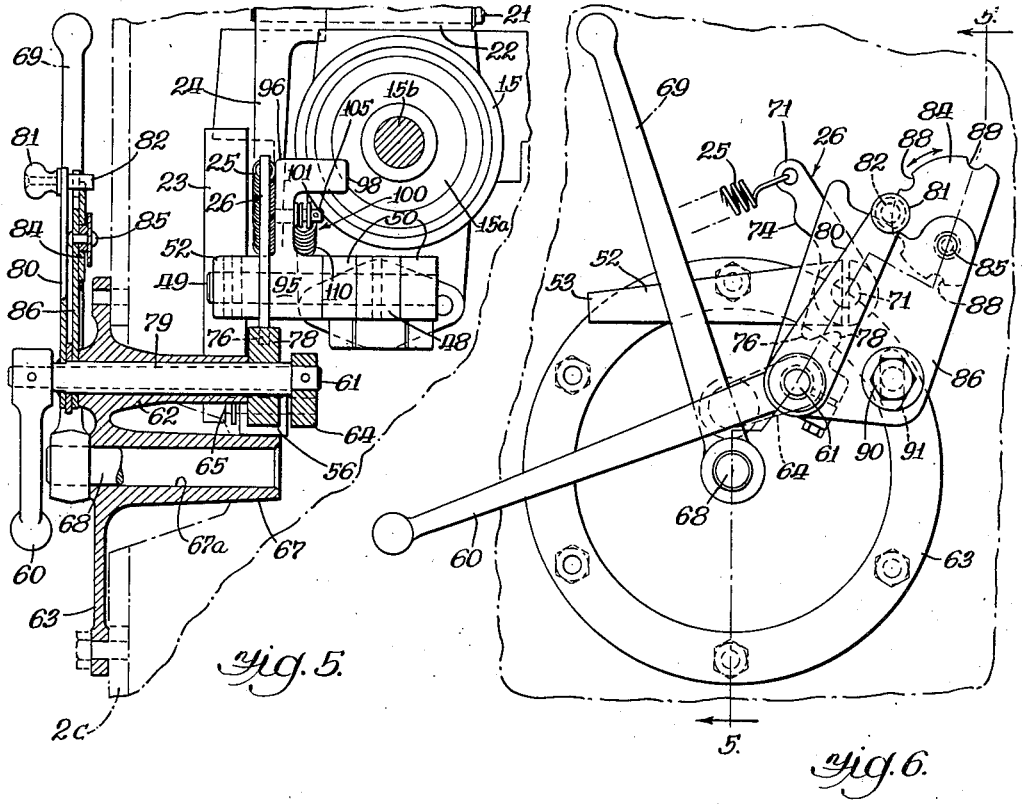
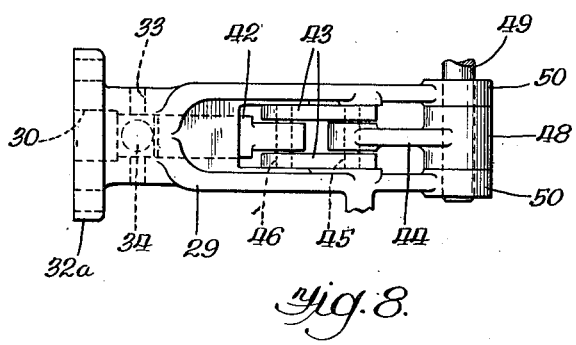

United States Patent Office

2,790,365
Patented Apr. 30, 1957

2,790,365

CONTROLS FOR TRACTORS

Ernest V. Bunting, Detroit, Mich., assignor to Harry Ferguson, Inc., Detroit, Mich., a corporation of Delaware Application June 29, 1954, Serial No. 440,029

3 Claims. (Cl. 97—46.09)

The invention relates to controls for tractors and comparable power driven vehicles arranged for direct mounting of implements thereon and more particularly to automatic controls for preventing damage to the tractor or implement by excessive draft loads resulting from the implement meeting an obstruction.

One object of the invention is to provide control means for tractors of the above general character which is operable in direct response to abrupt deceleration of the tractor to relieve or reduce the tractive effort on the tractor's drive wheels.

Still another object is to provide improved overload release means particularly suitable for use with tractors equipped for automatic control of implement working depth which is operative to detect impending overloads and to prevent such overloads from becoming excessive without regard to the setting of the depth control mechanism, implement weight, or other factors that affect overload release arrangements heretofore available.

A further object is to provide an inertia operated overload release mechanism for tractors which is readily adjustable to determine the rate of deceleration at which a releasing action will occur.

It is also an object of the invention to provide an overload release mechanism which is efficient and dependable on operation and which is sufficiently rugged to stand up under the hard usage to which such mechanisms are commonly subjected when incorporated in farm tractors.

Other objects and advantages of the invention will become apparent from the following detailed description of the preferred embodiment illustrated in the accompanying drawings in which Figure 1 is a side view of one type of tractor to which the overload release mechanism constituting the invention may be applied, parts of the tractor being broken away to show the power lift mechanism.

Fig. 2 is a fragmentary longitudinal sectional view through the tractor body showing details of the release mechanism.

Fig. 3 is a fragmentary elevational view of the mechanism shown in Fig. 2 viewed from the left side of that figure.

Figure 4 is an enlarged fragmentary sectional view taken in a plane substantially on the line 4—4 of Fig. 2.

Fig. 5 is a transverse sectional view through the mechanism taken in off-set planes substantially on the line 5—5 of Fig. 6.

Fig. 6 is a fragmentary elevational view of the mechanism taken from the left side of the tractor.

Fig. 7 is a longitudinal sectional view taken in a plane substantially on the line 7—7 of Fig. 3.

Fig. 8 is a fragmentary bottom view of the mechanism shown in Fig. 7.

While a particular embodiment of the invention has been shown in the drawings and will be described herein in some detail, there is no intention to limit the invention to details of that embodiment. On the contrary, the invention is to cover all modifications and alternative constructions falling within the spirit and scope of the invention as expressed in the appended claims.

In tractor-implement organizations in which the implement is coupled as a unit to the tractor as distinguished from merely being towed behind it, release or disconnection of the tractor from the implement when the latter strikes an obstruction is impractical for a number of reasons. It has therefore been proposed to provide in such tractors control mechanism actuated by a draft load imposed thereon by the implement for interrupting or substantially reducing the tractive effort on the tractor's drive wheels to prevent the draft load from building up sufficiently to damage either the tractor or the implement. Such mechanisms are commonly known as overload release means.

Overload release means may be arranged to interrupt or reduce the tractive effort of the tractor in various ways. Thus, the overload release means may be arranged to stop the transmission of power to the tractor drive wheels by disengaging the clutch, setting the brakes or shutting off the tractor engine (note the patent to Clark No. 2,521,503). In the case of tractors equipped with power elevatable hitch linkages of the type disclosed in the Ferguson Patent No. 2,118,181, equivalent results are obtained by interrupting the weight transfer action of the hitch linkage as an incident to the operation of the draft actuated means. This reduces the traction of the drive wheels and permits them to slip or spin without developing an excessive draft load on the linkage.

While the invention has been illustrated as incorporated in a tractor in which overload release is effected through the power lift mechanism associated with the hitch linkage, this is merely exemplary and it is to be understood that the invention is readily applicable to tractors equipped with other types of hitch linkages, and utilizing other means for preventing excessive draft loads. More particularly, the invention may be utilized in conjunction with any of a wide variety of overload release means which act to interrupt or reduce the tractive effort on the tractor drive wheels.

In carrying out the invention, means is provided for detecting an impending excessive draft load by sensing the rate of deceleration of the tractor. This detecting means is constructed and arranged to initiate operation of the release means when the deceleration rate approaches or reaches a predetermined limit value. The deceleration sensing means comprises generally an inertia member 10 (Fig. 2), preferably of substantial weight, mounted on and movable with the tractor and also movable relative to the tractor in a plane parallel to the normal path of the movement of the tractor. More particularly, the member 10 is supported so that the inertia forces acting thereon when its support, namely, the tractor, is decelerated tend to move it relative to the support. Such relative movement is utilized to trip or trigger a release linkage, indicated generally at 11, which, in turn, actuates the overload release means of the tractor. To prevent such release under normal conditions of operation, provision is made for restraining the inertia member 10 against movement relative to the tractor as long as the inertia forces acting thereon remain below a predetermined value.

Turning now to a more detailed description of the exemplary embodiment of the invention, attention is first directed to the particular tractor T (Fig. 1) in association with which it has been shown. This tractor has the usual rear drive wheels 12 (of which only one is shown in Fig. 1) and a trailing implement hitch linkage, including a pair of laterally spaced draft links 13 universally pivoted at their forward ends on the tractor center housing. Also forming a part of the hitch linkage is a top or control link 14. Implements, such as the plow P shown, are coupled to the tractor through the medium of the hitch linkage.

Power operated lift means of the general type disclosed in the above-mentioned Ferguson patent is provided for raising and lowering the draft links 13 and the coupled implement. The power lift means in this instance comprises a hydraulic ram having a rearwardly opening cylinder 15 (Figs. 2 and 6) with a piston 15a working therein. The ram cylinder is supported within the tractor housing and the piston 15a is operatively connected to the hitch linkage so that, upon rearward movement of the piston, thrust is transmitted through its piston rod 15b to rock a cross-shaft 16 (Fig. 1) journaled on the tractor housing. This shaft is operatively connected by lift arms 16a and drop links 17 with the draft links 13 whereby the latter are raised incident to the rocking of the shaft in a counterclockwise direction as viewed in Fig. 1.

Pressure fluid is supplied to the closed end of the ram cylinder from a continuously driven pump 18 under control of valve mechanism selectively positioned by the joint action of a manually operable quadrant lever 19 and the control link 14 acting through a valve actuating linkage on the tractor. As described in the Ferguson patent, the arrangement is such that resistance to forward movement of the implement in the ground tends to rock the implement forwardly and advance the top link against the biasing force of a main control spring 19a acting on the valve linkage. The setting of the quadrant lever determines the force required to balance the control spring and accordingly the implement continues to descend until it reaches a working depth at which the balance of the system is restored. If the draft of the implement drops substantially below the selected value, the action of the controls initiates exhaust of fluid from the ram cylinder permitting the implement to descend to greater working depth. Conversely, if the draft on the implement increases, the valve mechanism is actuated to direct pressure fluid to the ram cylinder and thus raise the implement sufficiently to restore the balance in the system.

If the implement strikes an obstruction, the draft load on the tractor is increased abruptly and may become excessive unless the tractive effort on the tractor drive wheels is substantially reduced. Furthermore, the action of the automatic draft control is such that the lift device will attempt to raise the implement and thus transfer a greater portion of the implement weight and draft load to the drive wheels. The improved overload release mechanism, when applied to tractors of the above general character, is arranged to interrupt the load transfer action above mentioned by a quick release of pressure fluid from the ram cylinder. Upon such release the loading on the tractor drive wheels is substantially reduced so that they may slip or spin before the draft load reaches an excessive value.

For application to the exemplary tractor, the deceleration detecting inertia member 10 is preferably constructed as a pendulum and its motion relative to the tractor is a pivoting or swinging one. As shown in Fig. 2, the inertia member 10 comprises an elongated arm 20 supported at its upper end by a pivot pin 21 received in an apertured boss 22 integral with or rigidly attached to the upper portion of the ram cylinder 15. To impart the requisite mass to the inertia member, a weight 23, herein shown as a metal disc, is secured to the arm 20 as by a cross-pin 24 (Fig. 4).

Means is provided for yieldably restraining the inertia member 10 against forward swinging movement about its pivot in normal operation yet permitting such swinging when the rate of deceleration of the tractor exceeds a predetermined value. While any suitable spring means may be employed as the restraining means, it is preferred to utilize a coiled tension spring 25. As herein shown, the spring is anchored at one end to a member 26 adjustably carried on the supporting structure, as will be described hereinafter. At its other end the spring 25 is connected to the arm 20 by a bifurcated bracket 27 straddling the arm and apertured to receive the pin 24, as shown in Fig. 4.

Forward swinging of the inertia member 10 against the opposing force of the restraining spring 25 acts through the release linkage 11 to actuate the release means of the tractor which, in the exemplary embodiment, comprises a release or dump valve 28 (Fig. 7). This valve is operative when opened to quickly relieve the pressure in the ram cylinder 15 by venting the same to the sump or reservoir in which the fluid for the hydraulic system is stored. Such venting of the ram cylinder interrupts the lifting action of the ram and thus terminates the load transfer action of the hitch linkage so that the rear drive wheels are relieved of a part of their loading and may slip or spin harmlessly when forward movement of the tractor is blocked.

Referring to Fig. 7 of the drawings, the dump valve 28, as shown herein, comprises a casing 29 formed with a cylindrical bore 30 communicating at one end with the closed end of the ram cylinder 15 by way of a passage 31 formed in a boss 32 extending laterally from the cylinder. The valve may be conveniently secured in place by bolts 31a inserted through alined apertures in the boss 32 and flanges 32a formed on the valve casing (Fig. 2). An exhaust port 33 opens from the intermediate portion from the bore 30 to provide for discharge of fluid from the ram.

Disposed in the valve bore 30 adjacent the port 33 is a movable valve element 34, herein shown as a ball, adapted to seat in the adjacent end of a tubular element 35 defining an extension of the fluid passage 31. The element 35 is slidable endwise within a bushing 36 fixed within the bore 30 and extending into the passage 31. A spring 37 biases the element 35 inwardly or toward the port 33, its limit position being fixed by a shoulder 38 thereon in co-operation with the adjacent end of the bushing 36. A suitable sealing device, such as an O-ring 40, may be installed on the element adjacent the shoulder 38 to prevent leakage of fluid around the bushing.

It will be evident that with the above arrangement the pressure of the fluid in the ram cylinder will tend to unseat the ball 34 from sealing engagement with the tubular element 35 and will likewise urge that element inwardly of the valve bore. In the normal operation of the tractor the ball is held in sealing engagement with the tubular element and the latter is displaced outwardly a slight amount, as shown in Fig. 7, by the release linkage 11 held in valve closing position by the inertia member 10.

The release linkage 11, as herein shown, includes a plunger 42 slidable in the valve bore 30 and operative in its advanced position to engage the ball element 34 and hold it in the valve closing position shown in Fig. 7. Movement of the plunger to this position is effected by a toggle linkage comprising a pair of links 43 and 44 pivotally connected together at their adjoining ends by a pin 45. The link 43, as shown in Fig. 8, comprises two bars located on opposite sides of the plunger 42 and pivotally connected thereto by a pin 46. The sides of the plunger are preferably machined flat as indicated at 47 for accommodation of the bars constituting the link.

The link 44, as shown in Figs. 7 and 8, is formed at one end with a hub 48 which is non-rotatably fixed on a shaft 49 journaled in bearings formed in a pair of arms 50 integral with and extending rearwardly from the valve casing 29. Intermediate their ends, the arms are formed with pads 51 to retain the pin 45 in place against endwise displacement. Also fixed to the shaft 49 is a latch finger 52 (Figs. 2 and 5) which projects forwardly and has its nose portion 53 squared for engagement in a notch 54 in the rear face of the inertia member arm 20. The arrangement is such that when the inertia member is in the normal retracted position, latch finger 52 is held engaged in the notch by the spring 25 and the toggle linkage is restrained from movement to maintain the valve 28 closed. Upon forward movement of the inertia member, however, the latch finger is released from the notch 54 and allows the shaft 49 to be rotated by fluid force acting through the tube 35, ball 34 and the toggle linkage which in the closed position of the valve has a small moment arm with respect to the shaft 49. The latch finger 52 is thereby swung from the full line position shown in Fig. 2 to the position shown in broken lines in that figure. Pressure in the hydraulic system unseats the ball 34 when the tube 35 is stopped by engagement of its shoulder 38 with the O ring 40 to open a passage for the rapid venting of fluid from the ram cylinder 15. Excessive opening of the toggle links is prevented by engagement of the latch finger 52 with a resilient roller 56.

Following a release action, as above described, the valve 28 remains open to vent the ram cylinder pending manual resetting by the driver. This is advantageous in preventing re-establishment of normal traction of the drive wheels and any resultant "bucking" of the tractor before power transmission to the drive wheels can be interrupted by disengagement of the clutch or otherwise. The driver thus has ample time to disengage the drive clutch and after which the relief valve can be reclosed and the tractor backed to free the implement from the obstruction which brought about the release.

Reclosing and relatching of the release valve 28 is preferably effected by means of a manual operator, in this instance a lever 60, mounted on the side of the tractor within convenient reach of the driver. As shown in Figs. 5 and 6, the lever 60 is fixed on the outer end of a shaft extending through and rotatably supported in a cylindrical boss 62 formed on a cover plate 63 utilized to close an access opening in the side wall of the tractor center housing. Pinned or otherwise non-rotatably fixed on the inner end of the shaft 61 is an arm 64 which carries at its outer end a pin 65 (Fig. 2) extending beneath the latch finger 52 and journaling the roller 56 of rubber or other suitable resilient material positioned in the path of the latch finger.

The roller 56 when in normal position defines the limit position to which the latch finger 52 is permitted to drop and also the normal idle position of the hand lever 60. As will be seen by reference to Fig. 2, the pendulum arm 20 is extended sufficiently below the latch notch 54 to maintain engagement with the nose of the latch finger 52 when the latter is in its lower limit position, thus avoiding any possibility of the pendulum blocking return movement of the finger. As shown, the roller 56 is arranged to rest against a central boss 67 extending inwardly from the cover plate 63. It may be noted that this boss has a bore 67a which journals a shaft 68 for actuating the power take-off clutch of the tractor. The shaft is adapted to be rocked by a hand lever 69 fixed on its outer end.

Actuation of the hand lever 60 to close the overload release valve also acts to swing the latch finger 52 back to its latching position. Thus, as the shaft 61 is rocked clockwise (as viewed in Fig. 2) the roller 56 shifts the latch finger upwardly along an arcuate guide surface 70 formed on the lower end of the pendulum arm 20. When the latch finger reaches the notch 54 the arm 20 is snapped back by its tensioning spring 25 and the system is thus conditioned for normal operation.

Provision is made for adjusting the restraining force exerted on the inertia device 10 by the spring 25 so that the overload release may be set according to the requirements dictated by the conditions under which the tractor is operating. Such adjustment may be made conveniently by adjusting the effective strength of the spring and, to this end, the adjustably mounted member 26 to which the forward end of the spring is anchored, comprises a bell crank rotatable on the toggle supporting shaft 49, as shown in Figs. 2 and 5. One arm 71 of the bell crank extends generally upwardly from the shaft and its outer end is suitably apertured for attachment of the spring 25. Thus by rocking the bell crank, the spring may be stressed as required to provide an appropriate restraining force.

To determine the lowest permissible deceleration rate at which release may be effected, adjustable stop means is provided for limiting the swinging of the bell crank in a direction to relax the tension of the spring 25. The stop means as shown, comprises a stop screw 72, threaded into a boss 73 on the intermediate portion of the latch finger 52. The screw 72 has its head positioned for engagement by a nub or projection 74 on the arm 71. A locking nut 75 on the stop screw provides for retaining it securely in adjusted position.

Adjustment of the position of the bell crank 26 to increasingly stress the spring 25 and thus raise the acceleration rate required to initiate an overload release is effected through the other arm 76 of the bell crank. As will be seen by reference to Figs. 2, 5 and 6 of the drawings, the arm 76 extends generally downwardly from the shaft 49 into the path of a finger member 78 clamped or otherwise non-rotatably fixed to a tubular shaft 79 telescoping over the shaft 61 and terminating at each end short of the corresponding ends of the latter shaft. The arm 76 and finger 78 thus define a one-way thrust connection by which the bell crank 26 may be rocked clockwise (as viewed in Fig. 2).

Welded or otherwise rigidly secured to the outer end of the shaft 79 is an adjusting handle 80 (Figs. 5 and 6) fitted with a knob 81 for convenient actuation. Adjacent its outer end the handle 80 carries a stop pin 82 for cooperation with a notched sector cam 84 pivotally supported by a pin 85 on a stationarily supported mounting plate 86. As will be seen by reference to Fig. 6, the cam 84 is formed to define along its outer edge a cam surface that recedes progressively from the pivot 85. This edge is formed with a series of notches 88 for reception of the pin 82 and operative to hold the handle 80 in selected positions of adjustment.

It will be apparent from the foregoing that the cam 84 may be set to define selected limit positions to which the handle 80 may swing and thus correspondingly define the positions in which the spring anchoring bell crank 26 is maintained. In the exemplary embodiment, five of the notches 88 are provided in the cam 84, each serving to apply a different amount of tension to the spring 25 and thus provide for actuation of the overload release at different deceleration rates. By way of example, the parts of the mechanism may be constructed and dimensioned so that the various notches correspond to deceleration rates, such as $\frac{1}{2}g$, $\frac{3}{4}g$, $1g$, $1\frac{1}{4}g$ and $1\frac{1}{2}g$ ($g$ being approximately 32 feet per second$^2$). It will be understood, of course, that the mechanism may be constructed and arranged for other release values, if desired.

In order to simplify the initial adjustment of the mechanism, the cam carrying plate 86 is mounted so that it may be swung about the shaft 79 as an axis to variably locate the pivot of cam 84 with respect to the stop pin 82. Once the adjustment is made, the plate is rigidly clamped in place by a cap screw 90 (Fig. 6) inserted through a suitable slot 91 in the plate and threaded into the tractor housing. The screw 90 may constitute one of the screws utilized to attach the cover plate 63 to the housing.

In making the initial adjustment of the mechanism, the stop screw 72 is screwed in or out to apply the desired minimum tension on the spring 25. For obtaining the deceleration values above mentioned, the spring tension is adjusted by manipulation of the screw 72 so as to maintain the inertia member 10 in latching engagement with the finger 52 until the rate of deceleration of the tractor exceeds $\frac{1}{2}g$. Preliminary to adjusting the stop screw, the cam 84 is swung on its pivot to locate the $\frac{1}{2}g$ notch 88, that is, the notch of the lowest part of the cam, in position for engagement with the stop pin 82. Also, the screw 90 is loosened to free the mounting plate 86 and the plate is swung in a direction to withdraw the cam from the pin and to establish clearance between the bell crank arm 76 and the adjusting finger 78.

When the stop screw 72 has been finally adjusted, the mounting plate 86 is swung back until the finger 78 lightly engages the arm 76. The clamp screw 90 is then tightened and the pivot of the cam 84 is automatically located in proper relation to the other elements of the mechanism. Such setting of the mechanism may be considered as a permanent one and thereafter selective adjustment for any one of the five deceleration rates of release may be effected by turning the cam 84 to engage the stop pin 82 in the notch corresponding to the desired rate.

To guard against inadvertent operation of the overload release mechanism and the sudden dropping of an implement being carried in transport position, provision is made for automatically augmenting the spring load applied to the inertia member 10 when the hitch is raised to transport position. The increased load on the inertia member of course increases the deceleration rate required to trip the overload release means.

Referring to Figs. 2, 4 and 5 of the drawings, the means for increasing the spring loading on the inertia member in its preferred form, includes an actuating member 95 rotatably supported on the shaft 49 at one side of the bell crank 26. As shown, the actuating member has a radially extending arm 96 terminating at its outer end in an axially projecting finger 98 positioned for engagement by the skirt of the piston 15a as the latter swings the hitch linkage into transport position. When the linkage is lowered from transport position, the arm 96 is retained in the operating position indicated at B in Fig. 2 by the latched condition of the finger 52, as will be explained presently. The piston 15a rocks the arm to its rearward position C as the hitch linkage arrives in transport position. Upon release of the latch finger 52 from the notch 54 in the inertia arm 20, the arm 96 swings forwardly as indicated at A.

Connected between the arm 96 and the pendulum arm 20 is an extensible preloaded spring unit 100 that normally acts as a link of fixed length and holds the arm in its forward position without applying any load to the pendulum arm. Movement of the arm 96 to position C extends the spring unit and loads the pendulum arm in a direction to restrain its forward movement or, in other words, it adds to the spring load applied to the pendulum arm by the tension spring 25.

The spring unit 100 as shown comprises an elongated inner bar 101 (Fig. 4) sandwiched between two outer bars 102. At one end of the unit, in this instance the forward end, the bars 102 are apertured to snugly receive a reduced extension or pin 103 (Fig. 4) projecting from the inner end of the cross pin 24 which anchors the tension spring 25 to the pendulum arm. At the same end of the unit, the inner bar 101 is formed with an elongated open ended slot 104 dimensioned to slidably receive the pin 103. At the other end of the unit, the inner bar is apertured to snugly receive a pin 105 rigid with and projecting from one side of the arm 96. The corresponding ends of the outer bars 102 are formed with open ended slots 106 slidably receiving the pin 105.

Formed on the inner bar 101 adjacent its slotted end are abutments or spring stops 108. Similar abutments or spring stops 109 are formed on the outer bars 102 adjacent their slotted ends. Interposed between the two sets of spring stops is a compression spring 110 yieldably urging the inner and outer bars toward an extended position. By reason of their mounting on the pins 103 and 105, relative movement of the bars by the spring is precluded. Thus the inner bar 101 is blocked by the pin 103 engaging the end of the slot 104 while the outer bars are blocked by the pin 105 engaging the ends of the slots 106. Accordingly, the assembled bars or spring unit is conditioned to act as a rigid link of fixed length effective to retain the arm 96 in normal position B while the spring 110 is precluded from applying any spring load between the arm 96 and the pendulum arm 20.

When the arm 96 is swung to the right beyond position B by movement of the piston 15a to transport, the inner bar 101 is pulled rearwardly away from the pin 103. The spring 110 is thus compressed and urges the outer bars 102 in the same direction. Movement of the outer bars is blocked, however, since they are anchored to the pin 103 on the pendulum arm and that arm is also blocked against movement by the latch finger 52. Accordingly, the full force of the spring 110 is applied to the pendulum arm 20 in a direction to oppose its movement to release position. Since the spring 110 does not normally load the inertia member, it may have a much higher rating than the spring 25 so that a relatively heavy spring loading may be applied to the inertia member when the hitch linkage is raised to transport position. This additional loading prevents operation of the overload release unless the tractor is decelerated at an extreme rate, as, for example, a rate of 4g. Consequently, inadvertent operation of the overload mechanism is prevented.

The operation of the overload release mechanism above described, may be summarized briefly as follows. Under normal operating conditions, the latch finger 52 is latched in a raised position by engagement of its nose portion in the notch in the pendulum arm 20. The pendulum arm is yieldably retained in latching position by the tension spring 25. With the finger 52 in its raised position, the toggle linkage associated with the valve 28 is substantially straight and the valve is thus closed to the passage of fluid.

When the tractor is driven forwardly with the hitch linkage and implement lowered to working position, the draft control mechanism of the tractor operates in normal manner to retain the implement at a predetermined working depth. Should the tractor or the implement encounter an obstruction, however, the tractor is decelerated abruptly. If the rate of deceleration exceeds the value for which the cam plate 84 has been set, the inertia member 10 will swing forwardly against the force exerted by the spring 25. As a result, latch finger 52 is freed from the notch in the pendulum arm and swings downwardly under the biasing action of the valve spring 37 and the hydraulic pressure on the movable valve members 34 and 35. The toggle linkage will accordingly fold or jackknife downwardly to open the valve and thus allow the fluid to exhaust rapidly from the ram cylinder 15. The load transfer from the implement to the tractor is thus interrupted with a consequent reduction of the load on the tractor's rear wheels so that they can spin harmlessly.

After the tractor has been stopped, the mechanism may be reset by manually raising the hand lever 60. This swings the finger 52 back to latched position and closes the relief valve 28. The tractor is then in condition for normal operation and can be backed to free the implement from the obstruction.

The deceleration rate at which an overload release occurs may be changed at will by swinging the cam 84 on its pivot to locate the pin 82 in a selected notch in the cam. As the pin is moved from the lower to the higher notches in the cam, the tension on the spring 25 is increased due to the action of the finger 78 in rocking the spring anchoring bell crank 26 rearwardly. Setting of the mechanism below a predetermined inertia rate is precluded by the adjustable stop screws 72 coating with the bell crank.

Inadvertent operation of the overload release and consequent dropping of the implement from transport position is prevented by augmenting the spring load applied to the inertia member by the spring 25 when the linkage is raised to transport position. Since this is done automatically as an incident to the raising of the hitch linkage to transport position, the driver is relieved of the responsibility of taking this safety precaution.

It will be apparent from the foregoing that the invention provides a control mechanism of novel and advantageous construction operative to prevent the draft load on the tractor's hitch linkage from exceeding a predetermined safe value. The mechanism detects an impending excessive draft load in a novel manner by sensing the rate of deceleration of the tractor, rather than depending upon actuating forces transmitted from the implement attached to the tractor. This insures operation of the release mechanism under conditions which prevent the implement from transmitting the normal control forces, as for example, when it is hooked under an obstruction that prevents the forward rocking that normally occurs upon increased resistance to the movement of the implement through the ground. While the improved mechanism is particularly suitable for use with tractors equipped for automatic control of implement working depth, it is readily applicable to other types of implements and is of course independent of the specific character of the overload release means utilized to interrupt or reduce the tractive effort of the tractor drive wheels.

I claim as my invention:

1. In a tractor having an implement hitch and a power unit for raising and lowering the hitch between working and transport positions, the combination of overload release means, means for sensing the rate of deceleration of the tractor and for initiating the operation of said release means when the rate of deceleration reaches a predetermined value with the hitch in working position, and means operative upon movement of the hitch to transport position for restraining said sensing means from operating said release means until the rate of deceleration reaches a substantially higher value.

2. In a tractor having an implement hitch and a hydraulically operated actuator for raising and lowering the hitch, the combination with overload release means including a dump valve connected to the actuator and having a movable valve member biased toward open position by the pressure in the actuator, of means including a toggle linkage normally holding said valve member in closed position, an inertia member mounted on the tractor for movement relative thereto upon abrupt deceleration of the tractor, and means controlled by said member for breaking said toggle linkage to release said valve member for movement to open position.

3. In a tractor, the combination comprising an inertia member mounted on the tractor and movable forwardly relative thereto in response to abrupt deceleration of the tractor, means responsive to forward movement of said inertia member for relieving an overload on the tractor, a movable spring anchoring member, a spring connected between said anchoring member and said inertia member for resiliently resisting forward movement of the latter, adjustable stop means for adjusting the initial position of said anchoring member, an adjusting element having a one-way thrust transmitting connection to said anchoring member, and cam means operable to vary the position of said adjusting element to thereby change the position of said anchoring member and thereby change the resistance opposed to movement of said inertia member.

References Cited in the file of this patent

UNITED STATES PATENTS

| | | |
|---|---|---|
| 1,901,554 | De Wilde | Mar. 14, 1933 |
| 2,118,181 | Ferguson | May 24, 1938 |
| 2,521,503 | Clark | Sept. 5, 1950 |
| 2,629,306 | Rusconi | Feb. 24, 1953 |
| 2,654,301 | Bohmker | Oct. 6, 1953 |

FOREIGN PATENTS

| | | |
|---|---|---|
| 114,427 | Sweden | July 3, 1945 |